United States Patent [19]
Niwa et al.

[11] Patent Number: 5,332,317
[45] Date of Patent: Jul. 26, 1994

[54] SLIDING/ROLLING BEARING HAVING ROLLING ELEMENTS

[75] Inventors: Kosaburo Niwa; Hideyumi Matsumura, both of Nagoya, Japan

[73] Assignee: Daido Metal Company Ltd., Nagoya, Japan

[21] Appl. No.: 45,595

[22] Filed: Apr. 9, 1993

[30] Foreign Application Priority Data

Apr. 10, 1992 [JP] Japan .................................. 4-090991

[51] Int. Cl.$^5$ .......................... F16C 19/24; F16C 21/00
[52] U.S. Cl. ...................................... 384/548; 384/127
[58] Field of Search ........ 384/126, 127, 548, 551–555, 384/569, 572, 576, 282

[56] References Cited

U.S. PATENT DOCUMENTS

| | | | |
|---|---|---|---|
| 1,286,615 | 12/1918 | Hatashita | 384/548 |
| 2,222,491 | 11/1940 | Scribner | 384/282 |
| 2,986,430 | 5/1961 | Banerian | 384/127 |
| 3,161,449 | 12/1964 | Flom | 384/282 |
| 4,886,377 | 12/1989 | Adachi et al. | 384/548 X |

FOREIGN PATENT DOCUMENTS 1268799  3/1972  United Kingdom .

Primary Examiner—Thomas R. Hannon
Attorney, Agent, or Firm—Browdy and Neimark

[57] ABSTRACT

A small bearing which has the characteristics of a sliding bearing having a small coefficient of friction and of a rolling bearing, includes an outer metallic cylinder, a plastic inner cylinder, rolling elements, and a collar, with a plurality of rolling element holding grooves being provided on the outer peripheral surface of the inner cylinder. The grooves are formed in parallel with the axis of the bearing, and the rolling elements positioned therein are rotatable. Grease can be applied to the outer peripheral sur#ace of the inner cylinder, which holds the rolling elements, and the entire inner cylinder is covered with the outer cylinder, with the end portions of the outer cylinder being bent toward the axis. By forming the metal components from an austenite-type stainless steel, the problem of corrosion may be overcome.

2 Claims, 5 Drawing Sheets

SLIDING/ROLLING BEARING HAVING ROLLING ELEMENTS

BACKGROUND OF THE INVENTION

1. Field of the Invention

The present invention mainly relates to a small bearing serving both as a sliding and a rolling bearing.

2. Description of the Related Art

Generally, the load bearing mechanism of a rolling bearing includes an inner and an outer races, and a plurality of balls which move to roll between the both races. Typical examples of such a rolling bearing are a ball bearing as shown in FIG. 8 and a cylindrical roller bearing as shown in FIG. 9.

In a needle roller bearing, needle rollers move to roll between an inner and an outer races, or between an outer race and a shaft. Typical examples of the needle roller bearing are a shell-type needle roller bearing as shown in FIG. 10 and a solid-type needle roller bearing having an inner and an outer races as shown in FIG. 11.

In a sliding bearing, a relative sliding movement is performed between the bearing surface for bearing load and the shaft. A bush-type sliding bearing as shown in FIG. 12 is an example of this type of bearing.

In well-known rolling bearings, steel balls or needle rollers bear load in rolling contact while rotating and revolving. In producing such rolling bearings, the outer and inner races and the needle rollers are formed by machining and then subjected to processes such as quenching and polishing. Thus, a lot of processes and skills of experts are required, resulting in high production costs. Due to its mechanism, a rolling bearing develops a gap between its members when a wear loss resulting from the rolling contact has progressed to a certain degree, which leads to an increase in noise and a deterioration in bearing functions.

Even in cases where the bearing is required to be light and thin, a needle roller bearing, though poorer in function as compared to a sliding bearing, is adopted where bearing performances for medium and high-speed operations are required. That is, in the operational range of low load (at a bearing pressure ranging from 1 to 50 kgf/cm$^2$) and of medium and high speeds (at a peripheral speed ranging from 30 to 100 m/min.), needle roller bearings are being mostly adopted. When compared with a sliding bearing, a needle roller bearing has a larger wall thickness and a larger weight. Further, since its structure is the same for both large and small-load types, it is difficult to make its wall thickness as thin as in the case of a sliding bearing.

A shell-type needle roller bearing has a smaller wall thickness as compared to a solid-type needle roller bearing. However, it is difficult to reduce its wall thickness to the level of a sliding bearing. Although the wall thickness of a shell-type needle roller bearing can be made smaller than that of a solid-type needle roller bearing, it is necessary, due to the load transmission between the shaft and the rollers, to conduct finish processes, such as quenching and polishing are required, on the shaft, resulting in high production costs. Further, in long term operations, the problem of wear of the shaft is also involved.

In the case of small-diameter bearings, sliding bearings are generally lighter in weight as compared to rolling bearings. However, when used for medium and high-speed operations (at a peripheral speed ranging from 30 to 100 m/min. or higher), the sliding bearings require a lubricant (oil), which usually makes them rather expensive due to provision of the lubricant, lubrication method, etc. When a sliding bearing is used without lubrication, the friction generated is greater than in the case of a rolling bearing, so that a large driving force is required of the equipment concerned. It is true that a non-lubrication-type sliding bearing is advantageous in terms of weight and thickness as compared to a needle roller bearing. However, it is much poorer than the latter in terms of coefficient of friction. While the coefficient of friction ($\mu$) of a needle roller bearing ranges from 0.002 to 0.010, that of a non-lubrication-type sliding bearing (e.g., one of PTFE containing a filler material) ranges from 0.10 to 0.30. Thus, in the case of a non-lubrication-type sliding bearing, the equipment concerned must have a large driving force. Thus, for apparatuses which are intended to be smaller in size and weight, the large drive source and the large equipment weight constitute inhibiting factors. Further, it has conventionally been difficult to adapt a non-lubrication-type sliding bearing to medium-speed specifications (where the peripheral bearing speed ranges from 30 to 100 m/min.). Further, the relative sliding movement between the shaft and the bearing causes wearing thereof to generate wear products of particles. Where a mechanism is required for preventing the generation of such wear products, designing of bearings is often difficult.

SUMMARY OF THE INVENTION

The present invention has been made in view of the problems mentioned above. An object of the invention resides in providing a bearing serving both as a rolling and a sliding bearing and which has a low friction-coefficient and is small in size and weight.

In the light of the object, there is provided, in accordance with this invention, a sliding/rolling bearing comprising an outer cylinder of metal, an inner cylinder of plastic, and a plurality of rolling elements provided between the outer and inner cylinders and consisting of steel wires, the inner cylinder of plastic having on its outer peripheral surface a plurality of rolling element holding grooves which extend along the axis of the bearing and which are parallel to one another, the rolling elements being positioned in the grooves in such a way as to be rotatable while being held in contact with the outer cylinder.

In the case of needle roller bearings, the roller holding member has conventionally been used mainly for the purpose of securing the needle rollers in position. Focussing attention on the holding member, the present inventors adopted an inner-cylinder structure which serves as both the holder and the inner race, lodging steel-wire rollers having satisfactory wear resistance in rolling-element holding grooves, which are provided on the inner cylinder made of plastic, in such a way that the rolling elements could rotate while bearing load, thereby enabling the rolling elements to perform load transmission while being held in contact with the outer cylinder.

With the structure of the present invention, the rotation of the plastic inner cylinder, fitted onto a rotating shaft, causes the rolling elements to slightly rotate due to the difference between the frictional force of the holding grooves on the outer peripheral surface of the inner cylinder and that of the outer cylinder of steel (e.g., an austenite-type stainless steel), thereby attaining an improvement in terms of wear resistance without involving any local wear.

In the structure of the present invention, the shaft to be supported does not come into direct contact with the rolling elements, so that there is no need for a quenched inner race or a quenched shaft, which has been used in conventional rolling bearings. Further, the recent development of high strength plastics has made it possible for the wall thickness of the inner cylinder to be so large as to be close to that of a sliding bearing.

In the present invention, it is effective, in terms of corrosion prevention, to form the outer cylinder from an austenite-type stainless steel. The plastic inner cylinder is formed of one of the following materials: PEEK (polyether ether ketone), PES (polyether sulfone), PEN (polyether nitrile), PPS (polyphenylene sulfide), POM (polyacetal), PEI (polyether imide), and PAI (polyamide imide). Further, a filler material may be added to the above base material. Examples of the filler material include: solid lubricants, fluororesins, fiber materials, metal oxides, metal fluorides, and ceramics. In this regard, a fiber reinforced resin is suitably adopted. The rolling elements can be formed of austenite-type stainless steel wires, bearing steel wires, piano wires or the like.

Further, in the present invention, it is possible to apply a given amount of grease to the outer peripheral surface of the plastic inner cylinder for holding the rolling elements and cover the outer periphery of the inner cylinder with the outer cylinder, thereby attaining a friction coefficient of 0.01 to 0.05. The grease can be effectively sealed in and retained by imparting an appropriate configuration to the end portions of the inner and outer cylinders. At the same time, this structure helps to prevent intrusion of foreign matter from the outside. When used in lubricant, the bearing of this invention can also serve as a sliding bearing. This is the case, a friction coefficient of 0.002 to 0.010 can be obtained. Further, with the bearing structure of the present invention, the inner cylinder and the rolling elements are held inside the outer cylinder made of steel, so that the bearing can be assembled as a uniform unit having a small size.

DESCRIPTION OF THE PREFERRED EMBODIMENT

Figure 1:
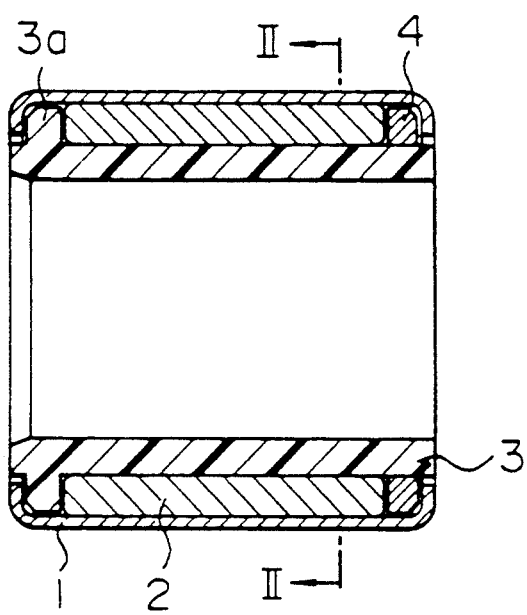
FIG. 1 is a sectional view of a bearing according to the present invention.
Figure 2:
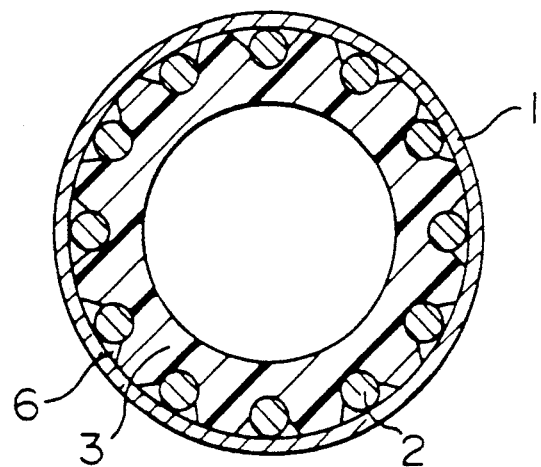
FIG. 2 is a sectional view taken along the line II—II of FIG. 1.
Figure 3:
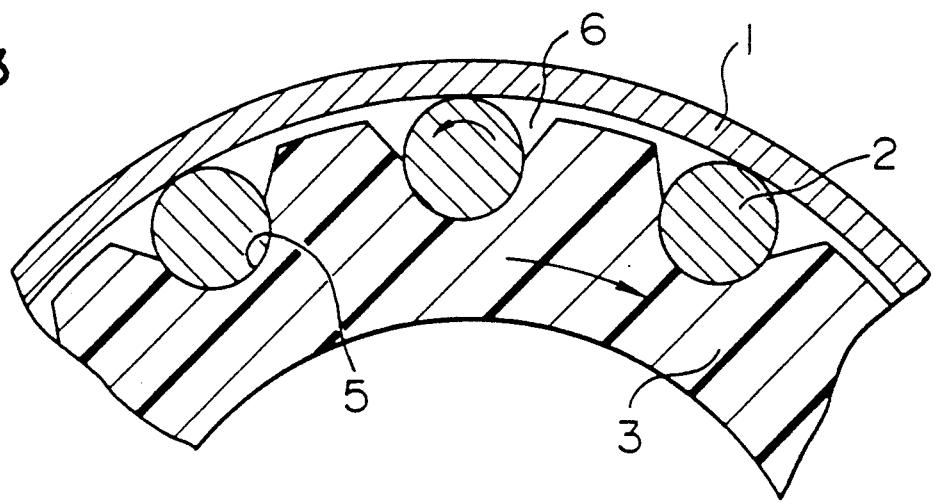
FIG. 3 is an enlarged view of the essential part of FIG. 2.

FIG. 1 is a sectional view, taken in the axial direction, of a bearing according to an embodiment of the present invention (which has, for example, an inner diameter of 10 mm, an outer diameter of 14 mm and an axial length (usually called as a width) of 10 mm). The bearing is mainly composed of an outer cylinder 1 made of an austenitic stainless steel (e.g., JIS SUS304 or JIS SUS307), rolling elements 2 made of an austenitic stainless steel (e.g., JIS SUS304 or JIS SUS307), an inner cylinder 3 made of plastic, and a collar 4.

The outer cylinder 1 is formed from a thin plate of an austenitic stainless steel. One end portion of the outer cylinder 1 is formed by a transfer press and the other end portion thereof is bent in the final stage of a bearing assembling process.

The plastic inner cylinder 3, which is formed by injection molding, has on the outer peripheral surface thereof a plurality (for example, ten to twenty-four) of holding grooves 5 for rolling elements, which extend along the axis of the bearing and which are parallel to one another. At one end of the inner cylinder 3, the grooves 5 are terminated by a wall 3a for preventing the rolling elements 2 from axially coming off, whereas no such wall is provided at the other end because of a collar (annular ring) 4 fitted onto the other end of the inner cylinder 3. Rolling elements 2 are lodged in the grooves 5 in such a way as to be rotatable while being held in contact with the outer cylinder 1. The inner cylinder 3, on which the rolling elements 2 have been mounted and to the outer peripheral surface of which grease may be applied as needed, is incorporated into the outer cylinder 1. When applying grease, it is expedient to cant the walls of the upper half of each groove 5 so that they diverge outwardly, utilizing the resulting marginal space 6 as a grease reservoir. Then, the collar 4, serving as the rolling element stopper, is fitted onto the other end portion of the inner cylinder 3. When all the parts have thus been incorporated into the outer cylinder 1, one end portion of the outer cylinder 1 is bent inwardly toward the axis. The bending of the outer cylinder 1 helps, combined with the presence of the wall 3a and the collar 4, to effectively prevent leakage of grease to the exterior and, at the same time, intrusion of foreign matter into the bearing.

When forming the inner cylinder 3 from a fiber reinforced resin, a material consisting of a plastic with 5 to 50 wt % of carbon fibers added thereto (for example, PEEK plus 20 wt % of carbon fibers and 5 wt % of Teflon (a trade mark of a fluor-resin)) is used.

Figure 4:
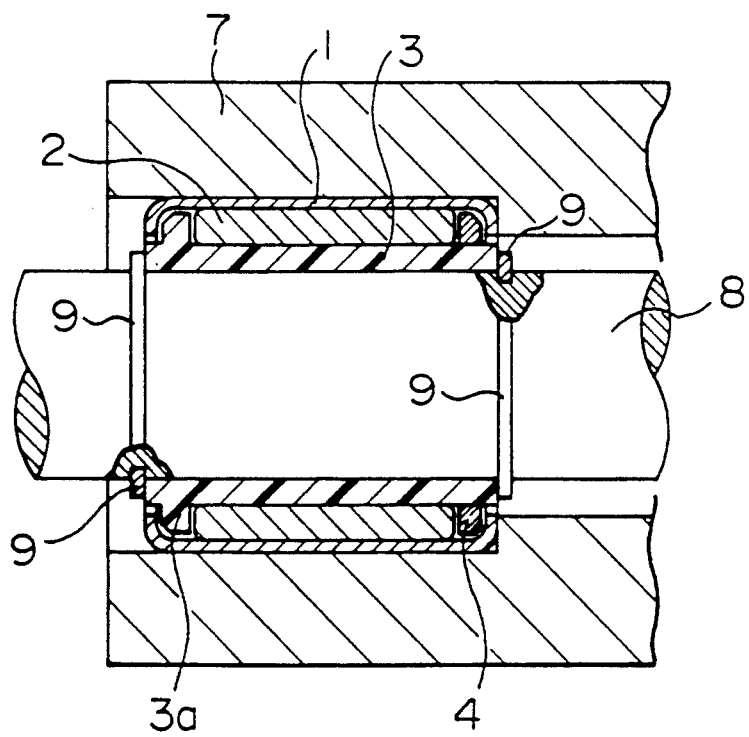
FIG. 4 is a diagram showing how a bearing according to the present invention can be used.
Figure 5:
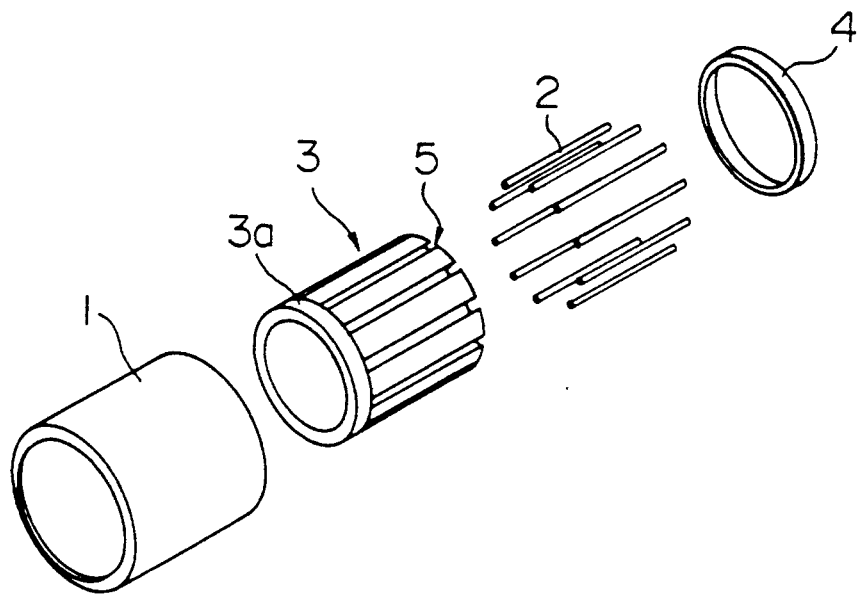
FIG. 5 is an exploded perspective view of a bearing according to this invention.

FIG. 4 shows an example of the way the bearing, constructed as described above, is used. The bearing is incorporated into a housing 7, and the shaft 8 to be supported is fitted into the bearing. A pair of locating snap rings (circlips) are attached to the shaft 8, thereby preventing the bearing from moving axially on the shaft. When using the bearing of the invention as a rolling bearing, the shaft 8 is pressed into the inner cylinder 3 with an interference of $(0.005 \text{ to } 0.02) \times D$ (D represents the diameter of the shaft 8) under a light pressure, causing the shaft to rotate together with the inner cylinder. When using the bearing of the invention as a sliding bearing, the shaft diameter D is made smaller than the inner diameter of the inner cylinder by (0.005 to 0.02)×D before fitting the shaft into the inner cylinder.

Figure 6:
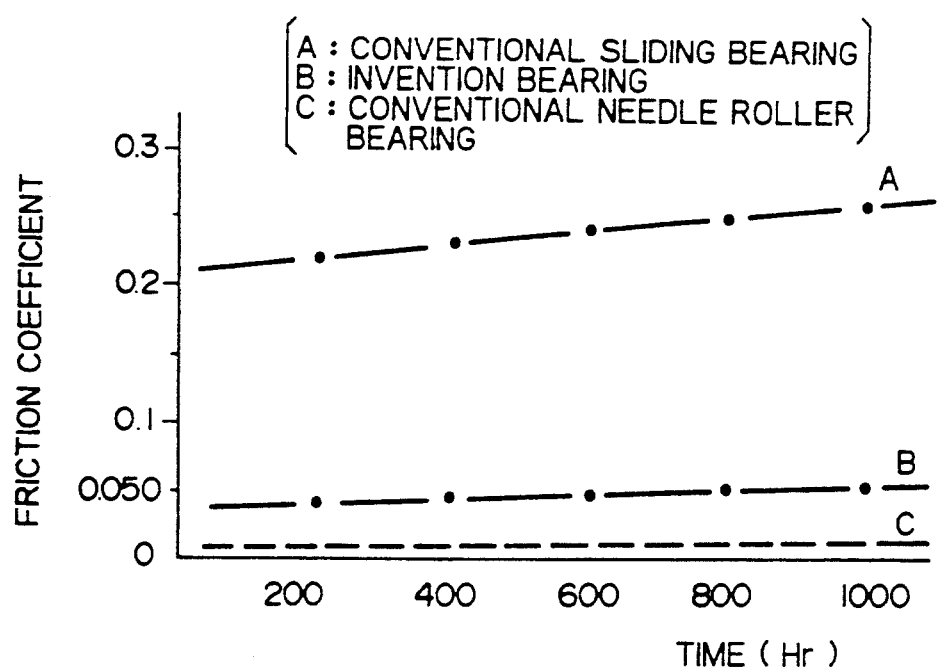
FIG. 6 is a graph showing the friction coefficient of an invention bearing vs. that of a conventional bearing.
Figure 7:
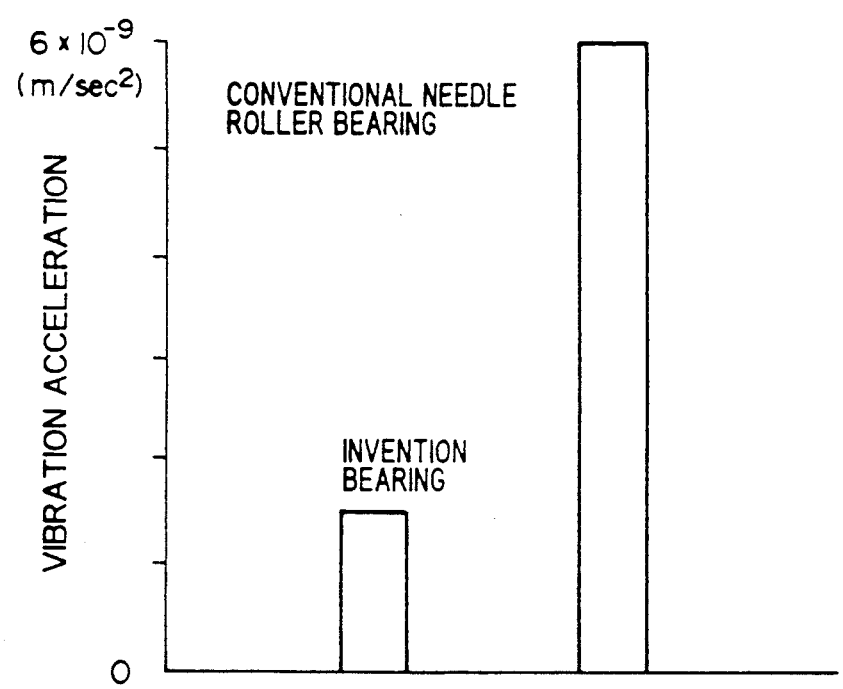
FIG. 7 is a graph showing the results of a vibration test performed on an invention bearing and on a conventional needle roller bearing.
Figure 8:
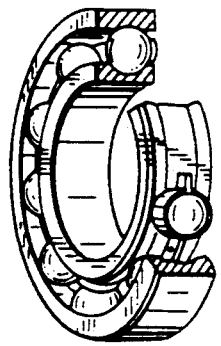
FIG. 8 is a perspective view of a conventional ball bearing.
Figure 9:
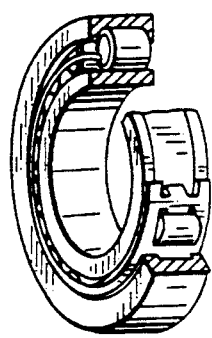
FIG. 9 is a perspective view, partially cut away, of a well-known cylindrical roller bearing.
Figure 10:
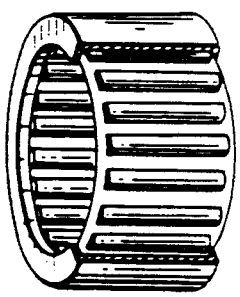
FIG. 10 is a perspective view, partially cut away, of a well-known shell-type needle roller bearing.
Figure 11:
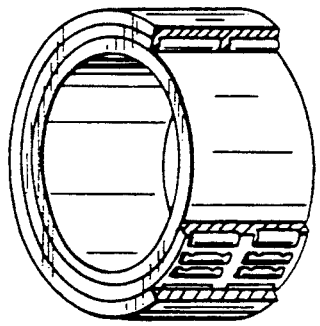
FIG. 11 is a perspective view, partially cut away, of a well-known solid-type needle roller bearing.
Figure 12:
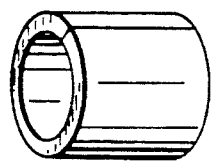
FIG. 12 is a perspective view of the bush of a well-known sliding bearing.

The performances of the invention bearing, constructed as described above, were confirmed by conducting tests to examine friction coefficient and vibration generating condition. Made in these tests were: 1) a comparison between the friction coefficient of an invention bearing and those of a conventional non-lubrication-type sliding bearing and of a conventional needle roller bearing; and 2) a comparison between the vibration generating condition in an invention bearing and that in a conventional needle roller bearing. The measurement of the friction coefficients (the friction test) was conducted under the conditions given in Table 1, and the test results are shown in FIG. 6. The vibration test was conducted under the conditions given in Table 2, and the test results are shown in FIG. 7. It can be seen from FIGS. 6 and 7 that the friction coefficient of the invention bearing is smaller than that of the conventional non-lubrication-type sliding bearing and, regarding the generation of vibrations, a substantial improvement has been achieved by the present invention over the conventional needle roller bearing.

TABLE 1

Friction Test

| Testing machine: | Spring-load-type bearing tester |
| --- | --- |
| Bearing inner diameter: | 10 mmφ |
| Bearing width: | 10 mm |
| Velocity: | 318 rpm |
| Load: | 5 kg |
| Testing time: | 1000 hrs. |

TABLE 2

Vibration Test

| Testing machine: | Spring-load-type bearing tester |
| --- | --- |
| Bearing inner diameter: | 10 mmφ |
| Bearing width: | 10 mm |
| Velocity: | 318 rpm |
| Load: | 0.5 kg |
| Testing time: | 1 hr. |

With a bearing having the construction of the above-described embodiment, the following advantages may be obtained: since the inner cylinder 3 is made of plastic, it provides a vibration absorbing effect, thereby restraining the generation of noise. Thus, it can be used as a bearing involving less noise and vibrations as compared to well-known needle roller bearings. In conventional needle roller bearings, a retainer for holding the rollers is used in addition to the inner race, whereas, in the bearing of the present invention, the inner cylinder, serving as the inner race, has the function of a retainer, which means the number of parts is reduced, thereby simplifying the bearing structure. Further, since the wall surfaces of the upper half of each rolling element holding groove 5, formed on the inner cylinder 3, are canted so that they diverge outwardly to define a marginal space 6, which can be used as a grease reservoir. Thus, it is possible for the grease to be retained in the bearing for a long term. The rolling elements 2, lodged in the holding grooves 5, are prevented from moving in the axial direction by the presence of the wall 3a and the stopper collar 4 at either end of the inner cylinder 3. Further, since the outer cylinder 1 and the rolling elements 2 are formed of an austenitic stainless steel, and the inner cylinder 3 is made of plastic, the bearing as a whole can be made free from corrosion by forming the collar 4 from an austenitic stainless steel or plastic. Thus, the bearing may be used in a simple manner even under unfavorable conditions, such as high temperature and high humidity, thus finding an extensive range of application.

Although the above embodiment has been described with reference to a simple, cylindrical bearing, the structure of the present invention can also be applied to a bearing having a flange at one end thereof (i.e., one whose inner and outer cylinders are both formed at one end into a flange shape).

As will be apparent from the above, the bearing of the present invention provides the following advantages:

1) The conventional needle roller bearing includes, in addition to the inner race, a retainer for holding the rollers, whereas, in the bearing of the present invention, the inner cylinder, which serves as the inner race, has the function of a retainer, which means the number of parts can be reduced, thereby simplifying the bearing structure.

2) In using a conventional shell-type needle roller bearing or a sliding bearing, it has been necessary to strictly specify the surface roughness and hardness of the shaft to be supported, resulting in a lot of time and labor being required for machining and polishing. When using the bearing of the present invention, in contrast, such processes are not needed, the material, surface roughness (finish surface precision), etc. being not so important with the bearing. Thus, the bearing can be applied to an aluminum alloy shaft, which is light and inexpensive. Further, when using a conventional needle roller bearing, quenching has been performed on the inner race and the associated shaft in order to ensure the requisite durability. In the invention bearing, the rolling elements do not come into direct contact with the associated shaft, so that there is no need to perform quenching. As a result, the cost for producing the shaft can be reduced, making the portions around the bearing less expensive.

3) The conventional needle roller bearing has been unsuitable for use in a small space, whereas, with the bearing of the invention, the wall thickness can be made so small as to be close to that of a sliding bearing, so that it can be incorporated into a very small space. Accordingly, the weight of the apparatus to be equipped with the bearing can be reduced (due to the reduction in bearing weight to approximately ⅓ to 1/5 of that of a conventional needle roller bearing) and, at the same time, a reduction in noise can be attained, which makes the bearing suitable for use in portable equipment or the like.

4) Since the inner cylinder is made of plastic, the problem of corrosion can be overcome by forming the outer cylinder and the rolling elements from an austenite-type stainless steel.

5) When the invention bearing is used as a rolling bearing, the load of the shaft fitted into the inner cylinder is transmitted in the order: the inner cylinder→the rolling elements→the outer cylinder. The inner cylinder is fitted onto the shaft and rotates with the same, with the rolling elements revolving with the inner cylinder while rotating. The rolling elements make a sliding movement in the holding grooves, which are provided on the inner cylinder, and a relative rolling movement with respect to the outer cylinder. Due to these two kinds of movement, effected simultaneously, a reduction in friction coefficient can be attained as compared to conventional non-lubrication-type bearings.

6) The bearing of the present invention has a smaller friction coefficient as compared to those of conventional needle roller bearings. Further, due to the vibration absorbing effect of the plastic inner cylinder, a reduction in noise can be attained. With these features, combined with the possibility of a reduction in wall thickness, the bearing of the invention may exhibit the characteristics of both a rolling and a sliding bearing.

What is claimed is:

1. A sliding/rolling bearing comprising:

an outer cylinder made of an austenitic stainless steel;

a pre-formed inner cylinder made of a fiber reinforced plastic material and having an outer peripheral surface, said plastic material being selected from the group consisting of polyether ether ketone, polyether sulfone, polyether nitrile, polyphenylene sulfide, polyacetal, polyether imide, and polyamide imide; and a plurality of rollers made of steel wire provided between said outer and inner cylinders, said inner cylinder having a plurality of steel roller receiving and holding grooves on said outer peripheral surface, said steel roller receiving grooves each being generally complementary in shape to no more than approximately 50% of the cross-section of its respective steel roller and said grooves extending along the axis of said inner cylinder parallel to one another, and said steel rollers being rotatably and slidably held in said grooves so as to be rotatable against said outer cylinder while being held in contact therewith.

2. A bearing according to claim 1 wherein said roller receiving grooves diverge outwardly toward said outer cylinder defining reservoir means (6) for receiving grease therein.

* * * * *